L. I. BODENHAMER.
Reciprocating Churns.
No. 140,880.  Patented July 15, 1873.
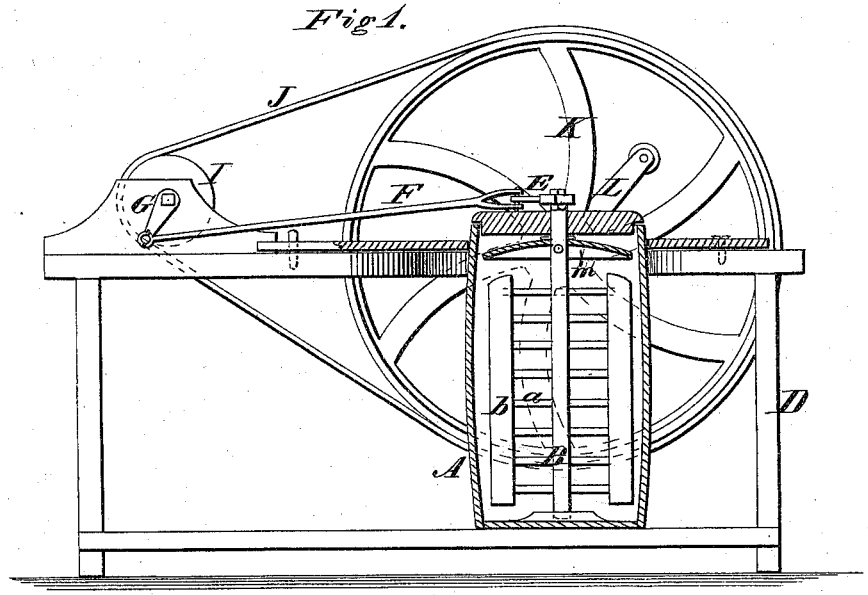
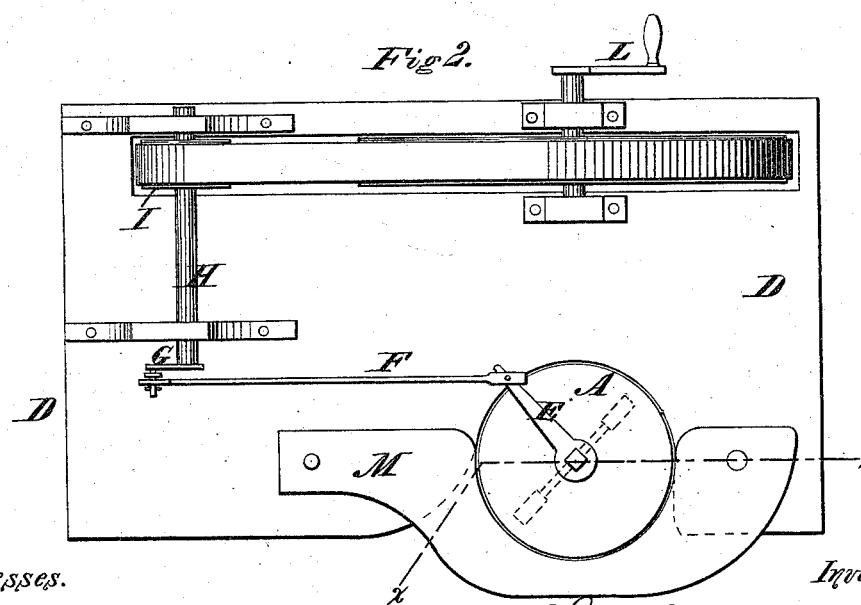
Witnesses.
Harry King.
H. H. Dodge.
Inventor.
L. J. Bodenhamer
By Dodge & Son
Attys.

UNITED STATES PATENT OFFICE.

LEVI ISAAC BODENHAMER, OF KERNERSVILLE, NORTH CAROLINA.

IMPROVEMENT IN RECIPROCATING CHURNS.

Specification forming part of Letters Patent No. 140,880, dated July 15, 1873; application filed January 10, 1873.

*To all whom it may concern:*

Be it known that I, LEVI I. BODENHAMER, of Kernersville, in the county of Forsyth and State of North Carolina, have invented certain Improvements in Churns, of which the following is a specification, reference being had to the accompanying drawings.

My invention consists in a churn having a vertical oscillating dasher, and in an arrangement of mechanism for operating the same.

Figure 1 is a side elevation of my complete apparatus with the churn proper broken away on the line $x$ $x$ of Fig. 2 in order to show its interior, and Fig. 2 a top-plan view of the same.

In constructing my churn I provide an upright body, A, of a cylindrical or other suitable form, and mount therein a vertical shaft, B, provided with radial arms $a$, which have vertical blades or dashers $b$ attached to their outer ends. The lower end of the shaft is supported in a step or bearing in the bottom of the body, while the upper end passes through and is supported by the lid or cover of the body. The shaft is so arranged that it can make about half a revolution, and is provided on its upper end with an arm or lever, E, by which to operate it. It is also provided, just below the lid or cover of the body, with a concave disk, $m$, to prevent the cream from splashing upward and working out around the shaft or the edges of the lid. The churn, constructed as above, I mount in a frame, D, as shown, securing it therein by a pivoted arm or yoke, M, which closes around the churn, and is fastened by a pin, $i$, as shown in both figures. Across the end of the frame I mount a shaft, H, provided on one end with a crank, G, and then connect said crank by a pitman, F, with the arm E of the churn shaft or dasher, as shown. On the outer end of the crank-shaft H I secure a pulley, I, and in the opposite end of the frame I mount a large wheel, K, having its shaft provided with a hand-crank, L, and then connect said wheel by a belt, J, with the pulley I, as shown.

Under this arrangement it will be seen that by turning the crank L the wheel K will be set in motion, and the belt caused to drive the pulley I, which, through shaft H, crank G, and pitman F, gives a reciprocating movement to the arm F so as to give the churn shaft and dashers an oscillatory or vibratory movement around the center. The arrangement enables the operator to give the dasher a very high rate of speed without requiring much labor. As the shaft turns in one direction the blades and arms sweep through and agitate the cream and set it to whirling around in the body, and then when the motion of the shaft is suddenly reversed the blades and arms are carried backward against the current of the cream so as to agitate it with great violence and set it to whirling in the opposite direction, and so on repeatedly. In this way the cream is churned, agitated, or dashed about in a rapid and violent manner, and the butter produced in a short time.

Having thus described my invention, what I claim is—

In combination with the churn A, the dasher B, consisting of the slats $a$ and $b$, and having attached to the upper portion thereof, within the churn, the deflector $m$, all substantially as described.

LEVI I. BODENHAMER.

Witnesses:
   J. D. WILDER,
   T. W. FARISH.